3,238,147
CRYSTALLINE ALUMINOSILICATE HYDROCARBON CONVERSION CATALYST COMPOSITE AND METHOD OF PREPARATION THEREOF
Robert H. Cramer, Woodbury, Abbott F. Houser, Cherry Hill, and Kenneth I. Jagel, Jr., West Deptford Township, Gloucester County, N.J., assignors to Socony Mobil Oil Company, a corporation of New York
No Drawing. Filed May 24, 1962, Ser. No. 197,288
13 Claims. (Cl. 252—453)

This invention relates to a process for preparing improved hydrocarbon conversion catalysts, to compositions of new and improved hydrocarbon conversion catalysts and to a process for converting hydrocarbon oils into more desirable liquid and gaseous products utilizing these new and improved catalysts. More particularly, the invention in one embodiment is directed to a method of preparing improved rare earth aluminosilicate-silica metal oxide gel hydrocarbon conversion catalysts which are characterized by high attrition resistance, high activity and high selectively. In another embodiment, the present invention is directed to a specific new and improved class of rare earth aluminosilicate silica-metal oxide gel hydrocarbon conversion catalysts and to the catalytic conversion of heavy petroleum fractions to lighter materials boiling in the gasoline range utilizing these new and improved catalysts.

As is well known, there are numerous materials, both of natural and synthetic origin, which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory, it is subject to improvement, particularly in regard to its ability to afford a high yield of useful product with a concomitant small yield of undesired product.

Modern catalytic processes, moreover, require catalysts which are not only specifically active in the chemical reactions which are to be catalyzed but also possess physical characteristics required for successful commercial operation. One of the outstanding physical attributes of a commercial catalyst is the ability to resist attrition. The ability of a particle to hold its shape in withstanding the mechanical handling to which it is subjected upon storage, shipment and use is a primary requirement for a successful catalyst and for modern catalytic processes.

Thus, commercial catalytic cracking has been carried out by contacting a hydrocarbon charge in the vapor or liquid state with a catalyst of the type indicated hereinabove under conditions of temperature, pressure and time to achieve substantial conversion of the charge to lower boiling hydrocarbons. Such cracking processes are generally advantageously carried out employing methods wherein the catalyst is subjected to continuous handling. In these operations, a continuously moving stream of hydrocarbon feed is contacted with a continuously moving stream of catalyst for the accomplishment of conversion and thereafter the catalyst is continuously regenerated and returned to the conversion zone. This continuous handling and regeneration of the catalyst particles results in considerable breakage and constant abrasion, thereby consuming the catalyst. It is therefore desirable to utilize a hard porous catalyst having the ability to withstand abrasion during the necessary handling involved during continual conversion and regeneration.

During catalytic conversion of high boiling hydrocarbons to lower boiling hydrocarbons, the reaction which takes place is essentially a cracking to produce lighter hydrocarbons but is accompanied by a number of complex side reactions, such as aromatization, polymerization, alkylation, and the like. As a result of these complex reactions, a carbonaceous deposit is laid down on the catalyst commonly called "coke." The deposition of coke tends to seriously impair the catalytic efficiency of the catalyst for the principal reaction and the conversion reaction is thereafter suspended after coke to the extent of a few percent by weight has accumulated on the catalyst. The catalytic surface is then regenerated by burning the coke in a stream of oxidizing gas and the catalyst is returned to the conversion stage of the cycle.

As will be realized, coke and other undesired products are formed at the expense of useful products, such as gasoline. It will also be evident that during the period of regeneration, the catalyst is not being effectively employed for conversion purposes. It accordingly is highly desirable not only to afford a large overall conversion of the hydrocarbon charge, i.e. to provide a catalyst of high activity, but also to afford an enhanced yield of useful products, such as gasoline, while maintaining undesired product, such as coke, at a minimum. The ability of a conversion catalyst to so control and to direct the course of conversion is referred to as selectivity. Thus, an exceedingly useful and widely sought characteristic in a cracking catalyst is high selectivity.

Inorganic oxide amorphous gels heretofore employed as hydrocarbon conversion catalysts have generally been prepared by the formation of a sol of desired composition that sets to a hydrogel after lapse of a suitable period of time. The hydrogel is base exchanged, washed free of soluble material to remove alkali metals and then dried to remove the liquid phase therefrom. It has heretofore been suggested that various finely divided water-insoluble solids be added to the sol before the same undergoes gelation for the purpose of increasing the porosity of the ultimate dried gel so that the regeneration characteristics thereof are enhanced upon use in catalytic hydrocarbon conversion operations. It has also been proposed that pulverized dried gel, clay and similar materials be incorporated in the hydrosol before gelation in order that the hydrogel resulting upon setting of such hydrosol may be subjected to rapid drying without undergoing substantial breakage. The improved regeneration characteristics and the improvement in drying obtained have been attributed to the fact that the finely divided solid contained in the hydrosol does not shrink to the extent that the hydrogel does during drying, thereby creating in the resulting dried gel a large number of macropores having diameters greater than about 1000 Angstrom units. While the gels so prepared containing pulverized material of appreciable particle size exhibit improvement in regeneration and during drying, the physical strength thereof has been weakened due to the presence of large pores in the gel structure.

Gel preparation has heretofore been carried out by drying hydrogel in a mass, which is subsequently broken up into pieces of desired size. Hydrogel has also been prepared and dried in the form of small pieces of predetermined shape such as obtained by extrusion, pelleting or other suitable means. In more recent years, gels have been produced in the form of spheroidal bead-like particles. The latter have had the advantage over irregularly shaped gel particles and over those obtained by extrusion or pelleting by being more resistant to attrition. The incorporation of finely divided solids of the type referred to hereinabove in the hydrosol used for the formation of gel beads has been found to undesirably decrease the hardness characteristics thereof, rendering the gel beads so produced more susceptible at attrition.

In accordance with the present invention, there is now provided a process for preparing improved silicia-metal oxide catalysts for the conversion of hydrocarbons, characterized by high resistance to attrition, high activity and exceptional selectively by intimate admixture of a finely divided rare earth aluminosilicate and a finely divided rare earth aluminosilicate-siliceous oxide gel which are distributed throughout and held suspended in a matrix of a silicia-metal oxide gel. The gelation is conducted at a pH in the range of 7.2 to about 8.5. The gel is base exchanged with a solution containing ammonium ions to effectively replace the alkali metal content of the base-exchanged composite, washed free of water soluble matter, dried and thermally activated at a temperature in the range from about 500 to about 1500° F.

One procedure which can be used to prepare the catalysts of the invention is by dispersing a finely divided rare earth aluminosilicate and a finely divided rare earth aluminosilicate-siliceous oxide gel in an alkali metal silicate solution used to prepare the silica-metal oxide sol for a period of time in the range from about 3 seconds or 0.05 to about 90 minutes. The resulting mixture is combined with an acidic metal salt solution such as sulfuric acid and aluminum sulfate to yield the corresponding silica-metal oxide sol. The resulting silica-metal oxide sol is permitted to gel at a pH in the range from about 7.2 to about 8.5. The gel is then base exchanged with a solution characterized by a pH in excess of 4.5 containing ammonium ions to effectively reduce the sodium metal content of the base-exchanged composite and subsequently washed free of water soluble matter, dried and thermally activated at a temperature in the range from about 500 to about 1500° F. The finely divided rare earth aluminosilicate siliceous oxide gel which is added in the alkali metal silicate solution used to prepare the silica metal oxide sol can be any type of rare earth aluminosilicate siliceous oxide gel which is substantially free of hydrocarbon conversion poison materials and which has a weight mean particle diameter below about 10 microns. The rare earth aluminosilicate which is utilized has a structure of rigid three dimensional networks characterized by uniform pores greater than 6 Angstrom units and preferably between 6 and 15 Angstrom units in diameter and a weight mean particle diameter below about 10 microns. The unique feature of the catalyst pertains to the fact that fines are actually added to the composite which improves the physical hardness of the resulting catalyst while exceptional catalyst activity and selectivity are substantially maintained.

In addition to the above-described process for the preparation of the improved hydrocarbon conversion catalysts, the present invention provides a new and improved class of hydrocarbon conversion catalysts which comprises a silica-metal oxide gel formed at a pH in the range from about 7.2 to 8.5 in which is mixed a finely divided rare earth aluminosilicate having uniform pore openings greater than 6 Angstrom units and preferably between 6 and 15 Angstrom units and a weight mean particle diameter below about 10 microns in amounts ranging from about minor amounts or 1 weight percent or lower to about 29 weight percent based on the dry solids basis of the finished catalyst and a finely divided rare earth aluminosilicate siliceous oxide gel which is substantially free of catalystic conversion poison material and which has a weight mean particle diameter below about 10 microns in amounts ranging from about 1 to about 29 weight percent based on the dry solids of the finished catalyst; the total amount of fines of rare earth aluminosilicate and rare earth aluminosilicate siliceous oxide gel ranging from about 15 to about 30 weight percent based on the dry solids of the finished catalyst.

The catalysts prepared by the present invention are obtained by intimately admixing the finely divided rare earth aluminosilicate and rare earth aluminosilicate siliceous oxide gel in the alkali metal silicate solution used to prepare the silica-metal oxide sol. The resulting mixture is then combined with an acid solution which contains a compound of a metal, the oxide which is desired to cogel the silica to form a sol. The resulting silica-metal oxide sol is gelled at a pH within the range from about 7.2 to about 8.5 to form the desired gel. The resulting gel is base exchanged with a solution characterized by a pH in excess of 4.5, preferably between 5 and 10, containing ammonia ions to effectively reduce the sodium metal content of the base-exchanged inorganic oxide composite to below about 8 weight percent sodium, a desirable level below about 3 weight percent, a preferred level below about 1 weight percent and a more preferred level below about 0.3 weight percent all based on a dry solids basis. The base-exchanged material is washed free of water soluble matter, dried and subjected to a thermal treatment.

There are several essential and critical features in the preparation of the catalysts of the invention. It is essential that the gel formation of the sol is conducted at a pH in the range from about 7.2 to 8.5 to obtain the desired physical properties of the catalyst. At a pH formation lower than 7.2 and higher than 8.5, the desired physical properties of the catalyst are not obtained. It is a further requirement that the finely divided material used in the preparation of the catalysts should have a weight mean particle diameter of less than 10 microns, preferably between 2 and 7 microns and more preferably between 3 and 5 microns. The use of finely divided material having a weight mean partial diameter in excess of 10 microns gives rise to a physically weak product while the use of fines having a weight mean particle diameter of less than 1 micron produced a product of low diffusivity. An additional requirement necessary in the preparation of the catalysts of the invention relates to the contact time of the fines of rare earth aluminosilicate siliceous oxide gel with the alkali metal silicate used to prepare the silica-metal oxide gel. It has been found that a contact time in excess of 90 minutes at temperatures in the range from about 50° F. to about 110° F. will enable the alkali metal silicate to dissolve the rare earth aluminosilicate siliceous oxide gel fines and thereby lose the benefits which accrue to the finished catalyst by the presence of the finely divided material. It is highly desirable, therefore, to avoid any type of fines loss by dissolution in the alkali metal silicate so that in the production of the catalysts of the invention a careful control of the finished catalyst can be maintained.

It is yet another requirement to use specific amounts of materials in the preparation of the exceptional catalysts of the invention. The amount of finely divided rare earth aluminosilicate required ranges from about minor amounts or 1 weight percent or lower to about 29 weight percent, preferably in the range from about 3 to about 15 weight percent based on the finished dried catalyst. The rare earth aluminosilicate siliceous oxide gel which is used herein is present in the amounts ranging from about 1 to about 29 weight percent, preferably from about 5 to about 25 weight percent based on the dry solids of the finished catalyst. The total amount of fines, i.e. rare earth aluminosilicate and rare earth aluminosilicate siliceous oxide gel which is used to prepare the catalyst of the present invention with its desired physical properties is required to range from about 15 to about 30 weight percent based on the dry solids of the finished catalyst composite with a preferred range within the range from about 20 to about 25 weight percent based on the dry solids of the finished catalyst composite to obtain the optimum results.

The crystalline rare earth aluminosilicate employed in the preparation of the instant catalysts are frequently referred to as synthetic zeolites. These materials are essentially the dehydrated forms of crystalline hydrous siliceous zeolites containing varying quantities of rare earth and aluminum with or without other metals. The rare earth metal atoms, silicon, aluminum and oxygen in these zeolites are arranged in the form of an aluminosilicate salt in a definite and consistent crystalline pattern. The structure contains a large number of small cavities, interconnected by a number of still smaller holes or channels. These cavities and channels are precisely uniform in size. The rare earth aluminosilicates are prepared by base exchanging an alkali metal aluminosilicate which has a uniform pore structure comprising openings characterized by an effective pore diameter of between 6 and 15 Angstroms. The alkali metal aluminosilicate can be prepared following the general procedure described in U.S. 2,882,244, Belgium 577,642 and Belgium 598,582.

As indicated hereinabove, the crystalline alkali metal aluminosilicate is base exchanged before intimate admixture with the powder-silica metal oxide matrix material. Base exchange is effected by treatment with a solution essentially characterized by a pH in excess of about 4.5, preferably by a pH in the range of 5 to 10, and containing an ion capable of replacing alkali metal. The sodium metal content of the finished base-exchanged material should be less than about 3 and preferably less than about 2 percent by weight.

Base exchange required for introducing the necessary replacing ions is carried out for a sufficient period of time and under appropriate temperature conditions to replace at least about 80 percent of the alkali metal originally contained in the aluminosilicate and to effectively reduce the alkali metal content of the resulting composite to below about 8 weight percent, desirably below 3 weight percent and preferably below about 1 weight percent. It is contemplated that any ionizable compound of a rare earth metal may be employed for base exchange. Generally, an aqueous solution of a rare earth metal salt or mixture of rare earth metal salts will be employed. Thus, the rare earth metal salt may be a chloride, sulfate, nitrate, formate or acetate of cerium, lanthanum, praseodymium, neodymium, samarium, or other rare earths, as well as solutions containing mixtures of these ions and mixtures of the same with other ions, such as ammonium.

While water will ordinarily be the solvent in the base exchange solutions used, it is contemplated that other solvents, although generally less preferred, may be used. Thus, in addition to aqueous solutions, alcoholic solutions, etc. of suitable compounds as noted above, may be employed in producing the catalyst utilized in the present process. It will be understood that the compounds employed for the base exchange solution undergo ionization in the particular solvent used.

The concentration of compound employed in the base-exchange solution may vary depending on the nature of the particular compound used, on the alkali metal aluminosilicate undergoing treatment and on the conditions under which treatment is effected. The overall concentration of replacing rare earth ion, however, is such as to reduce the alkali metal content of the original alkali metal aluminosilicate to less than about 3 percent by weight, on a dry solids basis. Generally, the concentration of compound, the cation of which replaces alkali metal from the alkali metal alumino-silicate, is within the range of 0.2 to 30 percent by weight, although as noted hereinabove other solution concentrations may be employed, providing the sodium metal content is reduced to less than about 8, desirably below about 3 and preferably less than 2 percent by weight.

The temperature at which base exchange is effected may vary widely, generally ranging from room temperature to an elevated temperature below the boiling point of the treating solution. While the volume of base-exchange solution employed may vary widely, generally an excess is employed and such excess is removed from contact with the crystalline aluminosilicate after a suitable period of contact. The time of contact between the base-exchange solution and crystalline aluminosilicate in any instance in successive contacts is such as to effect replacement of the alkali metal ions thereof to an extent such that the sodium metal content of the composite after undergoing base exchange is less than 8 percent by weight, desirably below 3 percent and preferably below 1 weight percent. It will be appreciated that such period of contact may vary widely depending on the temperature of the solution, the nature of the alkali metal aluminosilicate used, and the particular compound employed for base exchange. Thus, the time of contact may extend from a brief period of the order of a few hours for small particles to longer periods of the order of days for large pellets. After base-exchange treatment, the product is removed from the treating solution. Anions introduced as a result of treating with the base-exchange solution are removed by water-washing the treated composite for such period of time until the same is free of said anions.

The silica-metal oxide gel employed serves as a matrix for the crystalline aluminosilicate and the rare earth aluminosilicate silica metal oxide fines distributed therein. For purposes of this invention, silica gel alone is not a suitable matrix to obtain the desired physical properties. The preferred matrix is a cogel of silica and an oxide of at least one metal selected from the group consisting of metals of Groups II, IIIB, IVA and VIA of the Periodic Table. Such components include for example, silica-alumina, silica-magnesia, silica-zirconia, silica-thoria, silica-beryllia, silica-titania as well as ternary combinations such as silica-alumina-thoria, silica-alumina-chromia, silica-alumina-zirconia, silica-alumina-thoria, silica-alumina-zirconia, silica-alumina-magnesia and silica-magnesia-zirconia. The silica content of the silica-metal oxide gel matrix utilized in the catalyst described herein will generally be within the approximate range of 85 to 99 weight percent with the metal oxide ranging from about 1 to about 15 weight percent. Particular preference is accorded the cogels of silica-alumina wherein the amount of alumina oxide ranges from about 2 to about 15 weight percent or higher, preferably in the range from about 4 to about 12 weight percent based on the finished dried gel matrix.

The alkali metal silicate reactant employed in the preparation of the present catalysts is generally sodium silicate but it is contemplated that other alkali metal silicates, such as potassium silicate, may likewise be used. The alkali metal oxide to silica ratio of the alkali metal silicate, for example, in sodium silicate the $Na_2O/SiO_2$ ratio, is an important factor influencing the contact time to be employed. Generally, the greater the ratio of alkali metal oxide to silica in the alkali metal silicate reactant, the less is the contact time between added powder and alkali metal silicate solution required to give comparable results, assuming, of course, that the minimum contact time specified hereinabove is observed. The ratio of alkali metal oxide to silica in the alkali metal silicate reactant employed in the present process should desirably be in the range of 1/1.6 to 1/3.8. A particularly preferred alkali metal silicate reactant is one having an alkali metal oxide to silica ratio in the range of about 1/2.0 to about 1/3.0. Thus, use of a sodium silicate solution having an $Na_2O/SiO_2$ ratio of 1/2.4 gave excellent results. The concentration of alkali metal silicate solutions employed in the present process is generally such that the silica content thereof is between about 5 percent and about 30 percent by weight.

After the rare earth aluminosilicate silica oxide slurry is formed, gelation of the resulting sol is effected by the addition thereto of an acidic solution which may contain one or more metal salts, as described above, the oxides of such metals being cogelled with silica. The acidic solutions used in gelation can include sulfuric acid, hydrochloric acid, nitric acid, acetic acid and the like, in which is mixed one or more metal salts such as aluminum sulfate, aluminum nitrate, zirconium sulfate, magnesium sulfate, titanium tetrachloride, chromium sulfate, and the like.

The fines of rare earth aluminosilicate siliceous oxide gel other than the rare earth aluminosilicate which is used to prepare the catalyst of the present invention can include rare earth aluminosilicate silica gel or the rare earth aluminosilicate silica-metal oxide gels using silica gel or the silica-metal oxides described above as the matrix with the rare earth alumino-silicate dispersed therein. It is essential that the finely divided rare earth aluminosilicate siliceous oxide gels used in the catalyst of this invention be substantially free of materials which may poison the hydrocarbon conversion process. For example, the presence of various metals such as nickel, vanadium iron, sodium, and the like in specific amounts are known to adversely affect hydrocarbon conversion of hydrocarbon oils. The siliceous oxide gels which contain these detrimental quantities of poisons must be avoided.

An advantage which accrues by the process of the present invention relates to the fact that after the initial rare earth aluminosilicate silica-metal oxide is prepared by dispersing the rare earth aluminosilicate in the silica-metal oxide matrix, utilizing similar reaction conditions as described herein, the fines of this material can be used in the form of a recycle operation to prepare the desired catalyst. However, the process and catalyst composition of the present invention are not deemed to be limited to the use of recycle fines but any other type of rare earth aluminosilicate silica-metal oxide gel fines, made in any other manner, can be used as long as these fines meet the specifications required of acceptable fines hereinbefore described.

The rare earth aluminosilicate silica-metal oxide gel product of this invention may be prepared in any desired physical form. Thus, the sol containing added crystalline rare earth aluminosilicate powder and powdered rare earth aluminosilicate siliceous oxide gel may be permitted to set in mass to a gel which is thereafter dried and broken into pieces of desired size. The pieces of gel so obtained are generally of irregular shape. Uniformly shaped pieces of gel may be obtained by extrusion or pelleting of the aluminosilicate-containing gel. Also, the hydrosol may be introduced into the perforations of a perforated plate and retained therein until the sol has set to a gel, after which the formed gel pieces are removed from the plate. The method of the invention, as indicated above, has been found to be particularly useful for the production of catalyst in the form of spheroidal particles. The sol containing powdered aluminosilicate produced in accordance with this invention may be made into spheroidal particles by any feasible process, such as methods described in patents to Marisic, for example, U.S. 2,384,946. Broadly, such methods involve introducing a sol into a column of water-immiscible liquid where it breaks into globules, for example, an oil medium wherein the sol breaks into globules, sets to a gel and the globules subsequently pass into an underlying layer of water from which they are sluiced to further processing operations such as base exchange, water-washing, drying and calcining. Larger size spheres are ordinarily within the range of from about $\frac{1}{64}$ to about $\frac{1}{4}$ inch in diameter, whereas smaller size spheres, which are generally referred to as microspheres, are within the range of from about 10 to about 100 microns in diameter. The use of the spherically shaped particles is of particular advantage in hydrocarbon conversion processes, including the moving catalyst bed processes, the fluidized process, etc. in which the spheroidal gel particles are subjected to continuous movement. As applied to the stationary bed, spheroidal catalyst particles provide effective contact between the reactants and the catalyst by avoiding channeling. It is accordingly a preferred embodiment of the present invention to prepare the described catalyst in the form of spheres, although it is to be realized that that method of the invention may also be employed in obtaining a mass of catalyst which may thereafter be broken up into particles of desired size. Likewise, the method described herein may be used for the preparation of the present catalysts in the form of particles of any other desired size or shape.

On forming the rare earth aluminosilicate silica-metal oxide gel composite of this invention, a substantial amount of sodium or other alkali metals provided by the alkali metal silicate are present in the final composite. To remove the alkali metals and especially sodium, it is desirable to base exchange the final composite with a solution containing ammonium ions. This base exchange is effected by treatment with a suitable ammonium solution such as ammonium chloride, ammonium sulfate, ammonium acetate, and the like, which is characterized by a pH in excess of about 4.5, preferably by a pH in the range of 5 to 10. The base-exchange operation is continued until the finished catalyst contains a sodium metal content of less than about 8, preferably less than about 1 percent and more preferably less than about 0.3 percent by weight. The time of the instant base-exchange contact may extend from a brief period of the order of a few hours for small particles to longer periods of the order of days for large pellets.

After the base-exchange treatment, the treating solution is removed from the product. Anions introduced as a result of treating with base-exchange solution are removed by water-washing the treated composite for such period of time until the same is free of said ions. The washed product is then dried in superheated steam to remove substantially all the water therefrom. While drying may be effected at ambient temperature in air, it is more satisfactory and preferable to facilitate the removal of moisture by maintaining the product at a temperature between about 260° F. and about 340° F. for 2 to 24 hours or longer, in superheated steam.

The dried material is then subjected to a treatment essential to render the composition more attrition resistant and more catalytically selective. Such treatment entails heating the dried material in an atmosphere which does not adversely affect the catalyst; such as steam, air, nitrogen, hydrogen, flue gas, helium or other inert gas. Generally, the dried material is heated in steam or steam-air mixture to a temperature in the approximate range of 500° F. to 1500° F. for a period of at least about 1 hour and usually between 1 and 48 hours. The finished catalyst product has a surface area, within the approximate range of 100 to 700 square meters per gram.

Cracking, utilizing the catalyst described herein, may be carried out at catalytic cracking conditions employing a temperature within the approximate range of 700° F. to 1200° F. and under a pressure from sub-atmospheric pressure up to several hundred atmospheres. The contact time of the oil within the catalyst is adjusted in any case according to the conditions, the particular oil feed and the particular results desired to give a substantial amount of cracking to lower boiling products. Cracking may be effected in the presence of the instant catalyst utilizing well-known techniques including, for example, those wherein the catalyst is employed in a fixed bed as a compact particle-form moving bed.

The cracking activity of the catalyst is a measure of its capacity to catalyze conversion of hydrocarbons and is expressed herein as the percentage conversion of a Mid-Continent gas oil having a boiling range of 450 to 950° F. to gasoline having an end point of 410° F. by passing vapors of the said gas oil through the catalyst at 875° F., substantially atmospheric pressure and a feed rate of 1.5–7.5 volume of liquid oil per volume of catalyst per hour for ten minute runs between regenerations. For purposes of this invention, a satisfactory catalyst having high conversion activity is one wherein the amount of conversion of gas oil exceeds about 35 volume percent with the production of $C_5+$ gasoline exceeding about 30 volume percent at a liquid hourly space velocity of 3.0 and a catalyst to oil ratio of about 2.0.

The attrition characteristics of the gels prepared in accordance with the method described herein were determined by an attrition test known as the Lauson Shaker Attrition (LSA) test. The procedure used in the test consists of shaking a 50 cc. sample of the product to be tested in a closed steel cup which is bolted to the piston of a motor-driven Lauson engine which operates at 1000 r.p.m. After shaking for a time sufficient to produce a 10 weight percent fines capable of passing through an 8-mesh (Tyler) screen, the sample is screened, weighed, and the percent loss is calculated. These operations are repeated until slightly more than half the sample has been reduced to fines. Cumulative losses are plotted against total shaking time for each cycle. The cumulative time in seconds for 50 percent weight of fines is read from the curve and is reported as the Lauson Shaker Attrition. Since the Lauson Shaker Attrition of gels is affected by the size of the particles tested, the attrition data reported herein is corrected to correspond to an average particle diameter of 0.140 inch to avoid the interference of this variable in correlating the effect of quantity and size of added powdered material on attrition. The satisfactory attrition characteristics of the catalysts prepared with the method described herein should exceed an LSA determination of 1000, preferably greater than 1500. A catalyst having an LSA determination below 1000 is not considered to have satisfactory attrition resistance.

The following comparative examples serve to illustrate the advantages of the process and catalyst of the present invention without limiting the same:

EXAMPLE 1

The crystalline sodium aluminosilicate having uniform pore openings between 6 and 15 Angstrom units used as the starting material to prepare rare earth aluminosilicate was prepared according to the procedure described in U.S. 2,882,244. The sodium aluminosilicate was base exchanged by the addition of an aqueous solution containing 4 weight percent rare earth chloride containing as its principal constituent cerium chloride, along with the chlorides of praseodymium, lanthanum, neodymium, and samarium. The amount of 4 percent rare earth chloride solution used was 1.67 pounds for each pound of sodium aluminosilicate per base exchange. Twelve one-hour base-exchange treatments were conducted at solution temperatures of 180 to 200° F. The resulting rare earth aluminosilicate is washed free of soluble salts and ball milled to reduce its size to approximately 4 microns.

EXAMPLES 2–5

In the following examples, a silica-alumina catalyst of Example 2 is compared with the rare earth aluminosilicate-silica metal oxide catalysts, containing recycle fines. The rare earth aluminosilicate-silica metal oxide catalysts are prepared utilizing specific proportions of starting materials and conditions as designated in Table I in the following general procedure:

An acid solution containing aluminum sulfate, sulfuric acid and water; a silicate solution containing sodium silicate, water and sodium hydroxide; and a fines slurry containing rare earth aluminosilicate of Example 1 and rare earth aluminosilicate-silica metal oxide fines which are recycle fines of the prepared catalyst and having a weight mean particle diameter of about 3 to 5 microns; are continuously mixed together through a mixing nozzle using the designated relative solution rates of addition. The resulting sol is formed in gel beads at temperatures in the range from 56 to 68° F. at a gelation time of from 4.6 to 5.0 seconds. The forming pH of the gel bead is maintained in the range from about 7.2 to about 8.5 to provide the desired physical properties of the catalysts. In the preparation of the catalysts of the present invention, the contact time of the rare earth aluminosilicate-silica-alumina recycle fines in the silicate solution is maintained for a period of time not exceeding 90 minutes.

The resulting beads are then base-exchanged at room temperature with an aqueous solution containing 1.4 to about 10 weight percent ammonium sulfate for a period of time to reduce the alkali metal content below about 1 weight percent of the finished dried product, and then

*Table I*

| Reactants | Examples | | | |
|---|---|---|---|---|
| | 2 | 3 | 4 | 5 |
| Acid Alum Solution: | | | | |
| Water* | | 90.91 | 90.91 | 90.91 |
| Aluminum Sulfate* | | 5.80 | 5.80 | 5.80 |
| Sulfuric acid* | | 3.29 | 3.29 | 3.29 |
| Specific gravity at 60° F | | 1.084 | 1.084 | 1.084 |
| Solution rate, cc./min | | 390 | 390 | 378 |
| Sodium Silicate solution: | | | | |
| Sodium Silicate (Na$_2$O/SiO$_2$=0.31/1)* | | 54.65 | 60.06 | 60.06 |
| Water* | | 42.88 | 37.14 | 37.14 |
| Sodium hydroxide* | | 2.47 | 2.80 | 2.80 |
| Specific gravity at 60° F | | 1.227 | 1.252 | 1.252 |
| Solution rate, cc./min | | 333 | 290 | 299 |
| Fines Slurry: | | | | |
| Water* | | 80.00 | 85.36 | 78.08 |
| Rare Earth aluminosilicate fines* | | 2.61 | 3.24 | 16.91 |
| Rare Earth aluminosilicate-silica alumina fines (recycle fines)* | | 17.39 | 11.40 | 5.01 |
| Specific gravity at 60° F | | 1.138 | 1.102 | 1.174 |
| Solution rate, cc./min | | 89.3 | 135 | 136 |
| Forming pH | | 8.4 | 8.0 | 8.1 |
| Gelation time, sec | | 4.6 | 4.9 | 5.0 |
| Temperature of gelation, ° F | | 68 | 56 | 56 |
| Composition of Finished Catalyst: | | | | |
| Aluminum oxide* | 7.8 | 7.9 | 7.8 | 6.7 |
| Silica* | 70.2 | 69.6 | 68.7 | 60.5 |
| Rare earth aluminosilicate* | | 3.6 | 5.2 | 25.3 |
| Recycle fines* | | 18.9 | 18.3 | 7.5 |
| Silica alumina fines | 22 | | | |
| Physical Properties: | | | | |
| Packed density, grams/cc | 0.82 | 0.79 | 0.76 | 0.64 |
| LSA 50% corrected to 0.140 inch average particle diameter | 1,340 | 1,580 | 2,800 | 580 |
| Cracking Properties: | | | | |
| Temperature, ° F | 875 | 875 | 875 | 875 |
| LHSV | 3 | 3 | 3 | 3 |
| Catalyst to oil ratio | 2 | 2 | 2 | 2 |
| Conversion, Percent Vol | 29.4 | 51.5 | 56.4 | 74.9 |
| Gasoline, C$_5$+Percent Vol | 24.2 | 41.6 | 46.8 | 56.2 |
| Total C$_4$'s, Percent Vol | 6.4 | 12.5 | 13.7 | 20.1 |
| Dry gas* | 2.8 | 4.8 | 5.1 | 7.5 |
| Coke* | 1.6 | 2.7 | 2.3 | 4.7 |

*Weight percent washed with water until the effluent water is free of sulfate and chloride ions. The washed gel beads are then steam dried at 260° F.–340° F. for approximately 3–5 hours, calcined in air for 3 hours at 1300° F. and steam dried for 24 hours at 1200° F. using 100 percent steam at 15 pounds per square inch gauge pressure. The resulting catalyst is then evaluated for cracking characteristics of gas oil. The details of catalyst preparation, catalyst composition and cracking results are set forth above in Table I.

In Table I, aluminum oxide in the gel matrix and rare earth aluminosilicate-silica metal oxide fines is used as the metal oxide but it is to be understood for purposes of this invention that at least one metal selected from the group of metals of Groups II, IIIB, IVA and VIA of the Periodic Table can be substituted for alumina or used in conjunction with alumina to provide an improved hydrocarbon conversion catalyst.

In Table I, it should be noted that the catalysts of Examples 3 through 5 are all more active than the silica-alumina without rare earth aluminosilicate catalyst of Example 2. On the other hand, the catalysts of Examples 2 through 4 are more attrition resistant than the catalyst of Example 5 which has a total amount of fines of rare earth aluminosilicate and rare earth aluminosilicate-silica alumina fines in excess of 30 weight percent.

EXAMPLES 6–8

In the following examples, the contact time of the rare earth aluminosilicate-silica-alumina fines with the sodium silicate solution is varied to determine its effect on the attrition resistance of the prepared catalysts. These catalysts are prepared in the similar manner and using the same starting materials as described for the Examples 3 through 5. Table II, below, describes the details of catalyst preparation and catalyst composition and properties of these examples.

*Table II*

| Reactants | Examples | | |
|---|---|---|---|
| | 6 | 7 | 8 |
| Acid Alum Solution: | | | |
| Water* | 90.91 | 91.40 | 91.40 |
| Aluminum sulfate* | 5.80 | 5.83 | 5.83 |
| Sulfuric acid* | 3.29 | 2.77 | 2.77 |
| Specific gravity at 60° F | 1.084 | 1.081 | 1.081 |
| Solution rate cc./min | 390 | 385 | 375 |
| Sodium silicate solution: | | | |
| Sodium silicate (Na$_2$OSiO$_2$=0.31/1)* | 60.06 | 61.71 | 61.71 |
| Water* | 37.14 | 36.34 | 36.34 |
| Sodium hydroxide* | 2.80 | 1.95 | 1.95 |
| Specific gravity at 60° F | 1.252 | 1.248 | 1.248 |
| Solution rate cc./min | 299 | 289 | 271 |
| Fines Slurry: | | | |
| Water* | 85.36 | 84.40 | 85.50 |
| Rare earth aluminosilicate fines* | 3.24 | 4.71 | 4.51 |
| Rare earth aluminosilicate-silica-alumina fines* | 11.40 | 10.89 | 9.98 |
| Specific gravity at 60° F | 1.102 | 1.111 | 1.105 |
| Solution rate cc./min | 136 | 131 | 159 |
| Contact time of sodium silicate solution and fines slurry, minutes | 3 | 30 | 124 |
| Gelatin time, sec. | 4.9 | 5.4 | 3.6 |
| Gelatin temperature, ° F | 56 | 48 | 56 |
| Composition of finished catalyst: | | | |
| Aluminum oxide* | 7.8 | 7.8 | 8.1 |
| Silica* | 68.8 | 68.2 | 68.8 |
| Rare earth aluminosilicate* | 5.2 | 7.0 | 6.2 |
| Rare earth aluminosilicate-silica-alumina fines* | 18.2 | 17.0 | 16.9 |
| Physical Properties: | | | |
| Packed density, grams/cc | 0.73 | 0.74 | 0.83 |
| LSA 50% attrition resistance corrected to 0.140 inch average particle diameter | 2,560 | 1,370 | 670 |

*Weight percent.

In Table II, the effect of contact time of the rare earth aluminosilicate and the rare earth aluminosilicate-silica-alumina fines combination with the sodium silicate solution is demonstrated. In Example 8 where the contact time is 124 minutes, a catalyst having an LSA attrition resistance of 670 is obtained which is not considered satisfactory while the catalysts prepared at a contact time below 90 minutes and preferably below 30 minutes, as described in Examples 6 and 7, will provide an active catalyst and one with exceptional attrition resistance.

A rare earth aluminosilicate silica-alumina catalyst was prepared without the addition of fines other than the rare earth aluminosilicate in a manner similar to the above-described examples. This catalyst has the following properties:

COMPOSITION OF FINISHED CATALYST

Aluminum oxide, weight percent _____ 4.8
Silica, weight percent _____ 69.2
Rare earth aluminosilicate, weight percent _____ 24.9

The LSA attrition resistance of this catalyst was 850 which is not considered to have acceptable attrition resistant properties.

It is to be understood that the foregoing description is merely illustrative of preferred embodiments of the invention of which many variations may be made by those skilled in the art within the scope of the following claims without departing from the spirit thereof.

What is claimed is:

1. A method for preparing improved hydrocarbon conversion catalysts characterized by high attrition resistance and high conversion activity which comprises preparing a rare earth crystalline aluminosilicate silica-metal oxide gel composite by intimately admixing in a silica-metal oxide sol: (1) a finely divided rare earth crystalline aluminosilicate having uniform pore openings greater than 6 Angstrom units in amounts ranging from minor amounts to about 29 weight percent on a dry solids basis of said composite and (2) finely divided rare earth crystalline aluminosilicate-siliceous oxide gel which has a weight mean particle diameter below about 10 microns, in amounts ranging from about 1 to about 29 weight percent on a dry solids basis of said composite; the total amount of fines of rare earth crystalline aluminosilicate and rare earth crystalline aluminosilicate-siliceous oxide gel ranging from about 15 to about 30 weight percent on a dry solids basis of said composite; effecting gelation of the resulting silica-metal oxide sol at a pH in the range from about 7.2 to about 8.5; base exchanging the resulting composite with a solution characterized by a pH in excess of 4.5 containing ammonium ions to effectively reduce the sodium metal content of the base-exchanged composite; washing the base-exchanged composite free of soluble matter; drying and heating the resulting product by subjecting the same to a temperature in the range from about 500° F. to about 1500° F. for at least 1 hour.

2. A method for preparing improved hydrocarbon conversion catalysts characterized by high attrition resistance and high conversion activity which comprises preparing a rare earth crystalline aluminosilicate silica-metal oxide gel composite by dispersing in an alkali metal silicate solution for a period of time in the range from about .05 to about 90 minutes: (1) a finely divided rare earth crystalline aluminosilicate having uniform pore openings greater than 6 Angstrom units in amounts ranging from about minor amounts to about 29 weight percent on a dry solids basis of said composite, and (2) finely divided rare earth crystalline aluminosilicate-siliceous oxide gel which has a weight mean particle diameter below about 10 microns, in amounts ranging from about 1 to about 29 weight percent on a dry solids basis of said composite; the total amount of fines of rare earth crystalline aluminosilicate and rare earth crystalline aluminosilicate-siliceous oxide gel ranging from about 15 to about 30 weight percent on a dry solids basis of said composite; combining the resulting alkali metal silicate solution with an acidic metal salt solution to yield the corresponding silica-metal oxide sol; effecting gelation of said sol at a pH in the range from about 7.2 to about 8.5; base exchanging the resulting composite with a solution characterized by a pH in excess of 4.5 containing ammonium ions to effectively reduce the sodium metal content of the base-exchanged composite to less than about 1 weight percent on a dry solids basis;

washing the base-exchanged composite free of soluble matter; drying and heating the resulting product by subjecting the same to a temperature in the range from about 500° F. to about 1500° F. for at least 1 hour.

3. A method for preparing improved hydrocarbon conversion catalysts characterized by high attrition resistance and high conversion activity which comprises preparing a rare earth crystalline aluminosilicate silica-metal oxide gel composite by dispersing in an alkali metal silicate solution for a period of time in the range of from about .05 to about 90 minutes: (1) a finely divided rare earth crystalline aluminosilicate having uniform pore openings between 6 and 15 Angstrom units and a weight mean particle diameter between about 2 and about 7 microns in amounts ranging from about minor amounts to about 29 weight percent on a dry solids basis of said composite, and (2) finely divided rare earth crystalline aluminosilicate-siliceous oxide gel which has a weight mean particle diameter between about 2 and about 7 microns, in amounts ranging from about 1 to about 29 weight percent on a dry solids basis of said composite the total amount of fines of rare earth crystalline aluminosilicate and rare earth crystalline aluminosilicate-siliceous oxide gel ranging from about 15 to about 30 weight percent on a dry solids basis of said composite; combining the resulting alkali metal silicate solution with an acidic metal salt solution to yield the corresponding silica-metal oxide sol; effecting gelation of said sol at a pH in the range from about 7.2 to about 8.5; base exchanging the resulting composite with a solution characterized by a pH in excess of 4.5 containing ammonium ions to effectively reduce the sodium metal content of the base-exchanged composite to less than about 1 weight percent on a dry solids basis; washing the base-exchanged composite free of soluble matter; drying and heating the resulting product by subjecting the same to a temperature in the range from about 500° F. to about 1500° F. for at least 1 hour.

4. A method for preparing improved hydrocarbon conversion catalysts characterized by high attrition resistance and high conversion activity which comprises preparing a rare earth crystalline aluminosilicate silica-metal oxide gel composite by dispersing in an alkali metal silicate solution for a period of time in the range from about .05 to about 90 minutes: (1) a finely divided rare earth crystalline aluminosilicate having uniform pore openings between 6 and 15 Angstrom units and a weight mean particle diameter between about 3 and about 5 microns in amounts ranging from about 3 to about 15 weight percent on a dry solids basis of said composite, and (2) finely divided rare earth crystalline alumino-silicate-siliceous oxide gel which has a weight mean particle diameter between about 3 and about 5 microns, in amounts ranging from about 5 to about 25 weight percent on a dry solids basis of said composite; the total amount of fines of rare earth crystalline aluminosilicate and rare earth crystalline aluminosilicate-siliceous oxide gel ranging from about 20 to about 25 weight percent on a dry solids basis of said composite; combining the resulting alkali metal silicate solution with an acidic metal salt solution to yield the corresponding silica-metal oxide sol; effecting gelation of said sol at a pH in the range from about 7.2 to about 8.5; base exchanging the resulting composite with a solution characterized by a pH in excess of 4.5 containing ammonium ions to effectively reduce the sodium metal content of the base-exchanged composite to less than about 1 weight percent on a dry solids basis; washing the base-exchanged composite free of soluble matter; steam drying at temperatures in the range from about 260° F. to about 340° F. and heating in the presence of steam the resulting product by subjecting the same to a temperature in the range from about 500° F. to about 1500° F. for at least 1 hour.

5. In a hydrocarbon conversion catalyst characterized by high attrition resistance and high conversion activity which consists essentially of a silica-metal oxide gel formed at a pH in the range from about 7.2 to about 8.5 in which is intimately dispersed finely divided rare earth crystalline aluminosilicate which has uniform pore openings greater than 6 Angstrom units in amounts ranging from minor amounts to about 29 weight percent on a dry solids basis and finely divided rare earth crystalline aluminosilicate-siliceous oxide gel which has a weight means particle diameter below about 10 microns in amounts ranging from about 1 to about 29 weight percent on a dry solids basis; said hydrocarbon conversion catalyst having a total amount of fines of the combination of rare earth crystalline aluminosilicate and rare earth crystalline aluminosilicate-siliceous oxide gel in the range from about 15 to about 30 weight percent based on a dry solids basis.

6. A hydrocarbon conversion catalyst characterized by high attrition resistance and high conversion activity which consists essentially of a silica-metal oxide gel formed at a pH in the range from about 7.2 to about 8.5 in which is intimately dispersed finely divided rare earth crystalline aluminosilicate which has uniform pore openings greater than 6 Angstrom units in amounts ranging from minor amounts to about 29 weight percent on a dry solids basis and finely divided rare earth crystalline aluminosilicate-siliceous oxide gel which has a weight mean particle diameter below about 10 microns in amounts ranging from about 1 to about 29 weight percent on a dry solids basis; said hydrocarbon conversion catalyst having a total amount of fines of the combination of rare earth crystalline aluminosilicate and rare earth crystalline aluminosilicate siliceous oxide gel in the range from about 15 to about 30 weight percent based on a dry solids basis and having a sodium metal content below about 1 weight percent on a dry solids basis.

7. A hydrocarbon conversion catalyst characterized by high attrition resistance and high conversion activity which consists essentially of a silica-metal oxide gel formed at a pH in the range from about 7.2 to about 8.5 in which is intimately dispersed finely divided rare earth crystalline aluminosilicate which has uniform pore openings between 6 and 15 Angstrom units and which has a weight mean particle diameter between 3 and 5 microns in amounts ranging from about 3 to about 15 weight percent on a dry solids basis and finely divided rare earth crystalline aluminosilicate-siliceous oxide gel which has a weight mean particle diameter between about 3 and about 5 microns in amounts ranging from about 5 to about 25 weight percent on a dry solids basis; said hydrocarbon conversion catalyst having a total amount of fines of the combination of rare earth crystalline aluminosilicate and rare earth crystalline aluminosilicate-siliceous oxide gel in the range from about 20 to about 25 weight percent based on a dry solids basis and having an alkali metal content below about 1 weight percent on a dry solids basis.

8. The catalyst of claim 7 wherein the silica-metal oxide is silica-aluminum oxide containing from about 4 to about 12 weight percent of aluminum oxide based on the dry gel matrix.

9. The catalyst of claim 8 wherein the finely divided rare earth crystalline aluminosilicate-siliceous oxide gel is rare earth crystalline aluminosilicate-silica-alumina.

10. A method of catalyst preparation which comprises introducing into a silica-metal oxide sol:
 (1) finely divided rare earth crystalline aluminosilicate having uniform pore openings greater than 6 Angstrom units in amounts ranging from minor amounts to about 29 weight percent on a dry solids basis of the finished catalyst and;
 (2) finely divided rare earth crystalline aluminosilicate-siliceous oxide gel having a weight mean particle diameter below about 10 microns in amounts ranging from about 1 to about 29 weight perecnt on a dry solids basis of the finished catalyst;
 the total combined amount of finely divided rare earth crystalline aluminosilicate and rare earth crystalline aluminosilicate-siliceous oxide gel ranging from about 15 to about 30 weight percent on a dry solids basis of the finished catalyst;

effecting gelation of the resulting silica-metal oxide sol at a pH in the range from about 7.2 to about 8.5;

washing the gel composite so obtained free of water soluble matter;

drying and heating the resulting product at a temperature in the range from about 500° F. to about 1500° F. for at least 1 hour.

11. The method of claim 1 wherein said finely divided rare earth crystalline aluminosilicate-siliceous oxide gel constitutes recycle fines of the prepared catalyst composition.

12. A method for preparing improved hydrocarbon conversion catalysts characterized by high attrition resistance and high conversion activity which comprises preparing a rare earth crystalline aluminosilicate silica-alumina gel composite by dispersing in an alkali metal silicate solution for a period of time in the range from about .05 to about 90 minutes: (1) a finely divided rare earth crystalline aluminosilicate having uniform pore openings between 6 and 15 Angstrom units and a weight mean particle diameter between about 3 and about 5 microns in amounts ranging from about 3 to about 15 weight percent on a dry solids basis of said composite, and (2) finely divided rare earth crystalline aluminosilicate-siliceous oxide gel which has a weight mean particle diameter between about 3 and about 5 microns, in amounts ranging from about 5 to about 25 weight percent on a dry solids basis of said composite; the total amount of fines of rare earth crystalline aluminosilicate and rare earth crystalline aluminosilicate-siliceous oxide gel ranging from about 20 to 25 weight percent on a dry solids basis of said composite; combining the resulting alkali metal silicate solution with an acidic aluminum salt solution to yield a silica-alumina sol containing from about 4 to about 12 weight percent of alumina on a dry solids basis; effecting gelation of said sol at a pH in the range from about 7.2 to about 8.5; base exchanging the resulting composite with a solution characterized by a pH in excess of 4.5 containing ammonium ions to effectively reduce the sodium metal content of the base-exchanged composite to less than about 1 weight percent on a dry solids basis; washing the base-exchanged composite free of soluble matter; drying and heating the resulting product by subjecting the same to a temperature in the range from about 500° F. to about 1500° F. for at least 1 hour.

13. A method for preparing improved hydrocarbon conversion catalysts characterized by high attrition resistance and high conversion activity which comprises preparing a rare earth crystalline aluminosilicate-silica alumina gel composite by dispersing in an alkali metal silicate solution for a period in the range from about .05 to about 90 minutes: (1) a finely divided rare earth aluminosilicate having uniform pore openings between about 6 and about 15 Angstrom units and a weight mean particle diameter between about 3 and about 5 microns in amounts ranging from about 3 to about 15 weight percent on a dry solids basis of said composite; and (2) finely divided rare earth crystalline aluminosilicate-silica alumina gel which has a weight mean particle diameter between about 3 and about 5 microns in amounts ranging from about 5 to about 25 weight percent on a dry solids basis of said composite; the total amount of fines of rare earth crystalline aluminosilicate and rare earth crystalline aluminosilicate-silica alumina gel ranging from about 20 to about 25 weight percent on a dry solids basis of said composite; combining the resulting alkali metal silicate solution with an aluminum salt solution to yield the corresponding silica-alumina sol containing from about 5 to about 12 weight percent of alumina on a dry solids basis; effecting gelation of said sol at a pH in the range of from about 7.2 to about 8.5; base exchanging the resulting composite with a solution characterized by a pH in excess of 4.5 containing ammonium ions to effectively reduce the sodium metal content of the base-exchanged composite to less than about 1 weight percent on a dry solids basis; washing the base-exchanged composite free of soluble matter; drying and heating the resulting product by subjecting the same to a temperature in the range from about 500° F. to about 1500° F. for at least 1 hour.

References Cited by the Examiner

UNITED STATES PATENTS

| | | | |
|---|---|---|---|
| 2,429,981 | 11/1947 | Bates et al. | 208—120 |
| 2,665,258 | 1/1954 | Lebeis | 252—448 |
| 2,962,435 | 11/1960 | Fleck et al. | 208—120 |
| 2,964,481 | 12/1960 | Cramer et al. | 252—455 |
| 2,971,903 | 2/1961 | Kimberlin et al. | 208—119 |
| 3,140,249 | 7/1964 | Plank et al. | 252—455 X |

MAURICE A. BRINDISI, *Primary Examiner.*

ALPHONSO D. SULLIVAN, *Examiner.*